Figure 1:
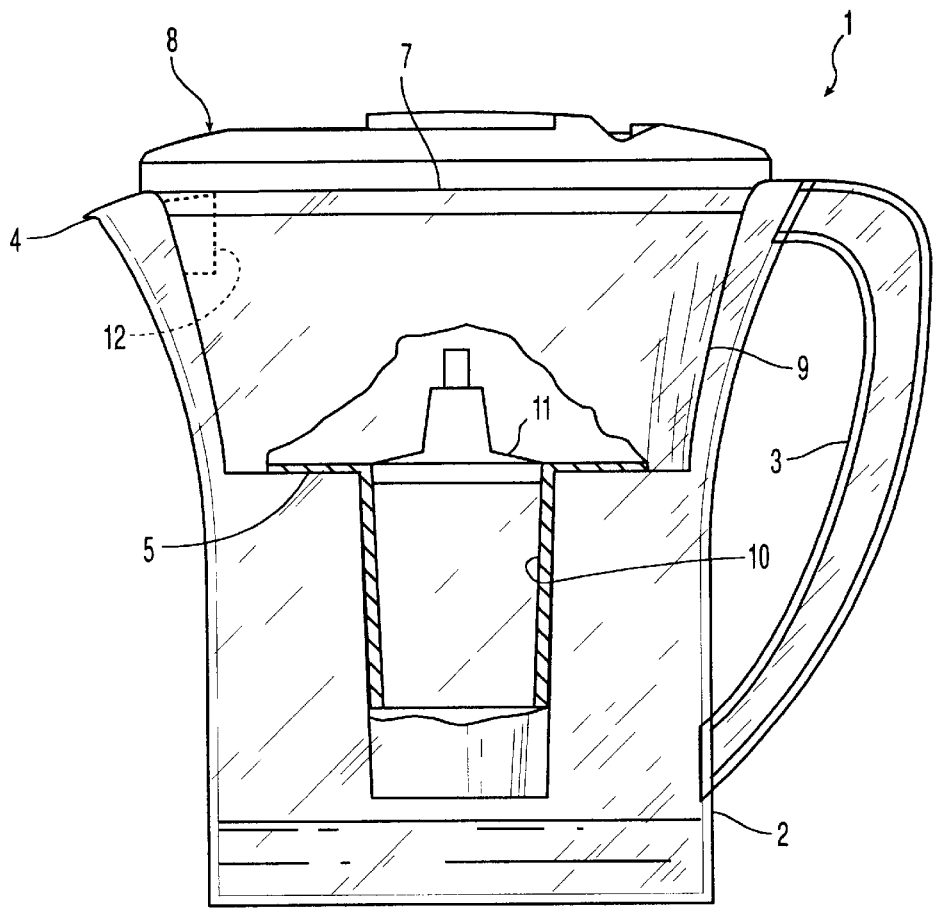

United States Patent [19]
Moretto

[11] Patent Number: 5,900,138
[45] Date of Patent: May 4, 1999

[54] VESSEL FOR FILTERING LIQUIDS, PARTICULARLY DRINKING WATER HAVING DEVICE FOR COUNTING OCCASIONS OF VESSEL ACCESS

[75] Inventor: Leonida Moretto, Vicenza, Italy

[73] Assignee: Laica S.R.L, Vicenze, Italy

[21] Appl. No.: 08/817,943

[22] PCT Filed: Oct. 27, 1995

[86] PCT No.: PCT/EP95/04231

§ 371 Date: Jun. 27, 1997

§ 102(e) Date: Jun. 27, 1997

[87] PCT Pub. No.: WO96/13318

PCT Pub. Date: May 9, 1996

[30] Foreign Application Priority Data

Oct. 28, 1994 [IT] Italy .................................. VI94A0156
Feb. 10, 1995 [IT] Italy .................................. VI95A0024

[51] Int. Cl.⁶ ............................ B01D 35/143; B67D 5/08
[52] U.S. Cl. .............................. 210/85; 210/94; 210/473; 222/23; 116/264; 116/284
[58] Field of Search .................................. 210/85, 87, 91, 210/94, 100, 464–469, 473–482; 222/23, 36, 189.06; 116/264, 284, 285, 286

[56] References Cited

U.S. PATENT DOCUMENTS

| | | | |
|---|---|---|---|
| 4,034,757 | 7/1977 | Glover | 222/36 |
| 5,139,666 | 8/1992 | Charbonneau et al. | 210/282 |
| 5,190,643 | 3/1993 | Duncan et al. | 210/85 |
| 5,209,375 | 5/1993 | Fuchs | 222/36 |
| 5,328,597 | 7/1994 | Boldt, Jr. et al. | 210/87 |
| 5,536,394 | 7/1996 | Lund et al. | 210/87 |

FOREIGN PATENT DOCUMENTS 2288529   10/1995   United Kingdom .

*Primary Examiner*—Joseph W. Drodge
*Attorney, Agent, or Firm*—Sughrue, Mion, Zinn, Macpeack & Seas, PLLC

[57] ABSTRACT

A vessel for filtering liquids includes a container and a receptacle for the liquid to be filtered, with a filtering device between the receptacle and the container. A lid is removably fitted to the container for the purpose of easy access to the container. A counting device is associated with the lid and is automatically activated by the removal of the lid for detecting and counting the occasions on which access is gained to the container by removing the lid.

6 Claims, 6 Drawing Sheets

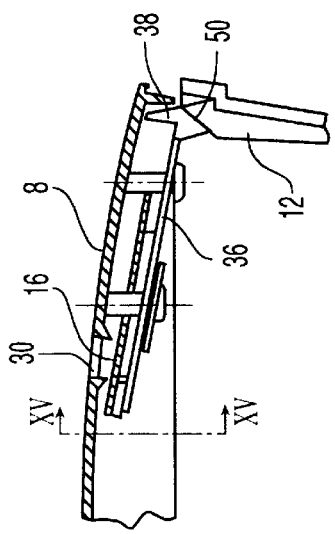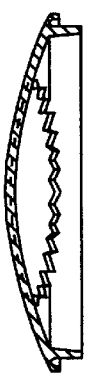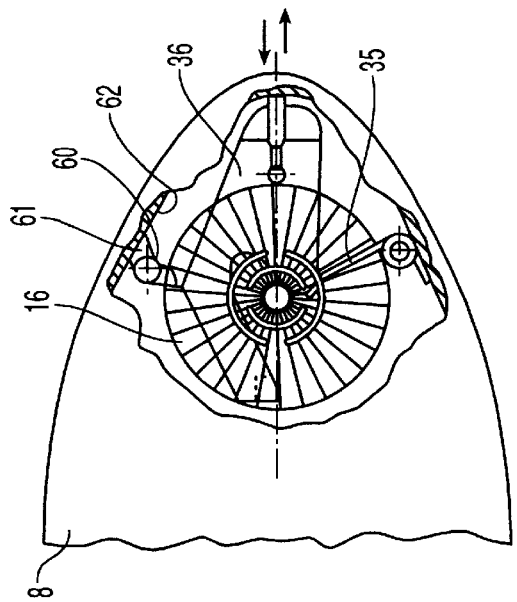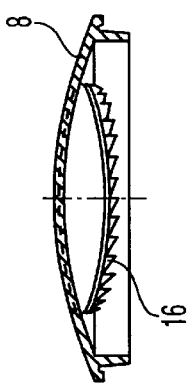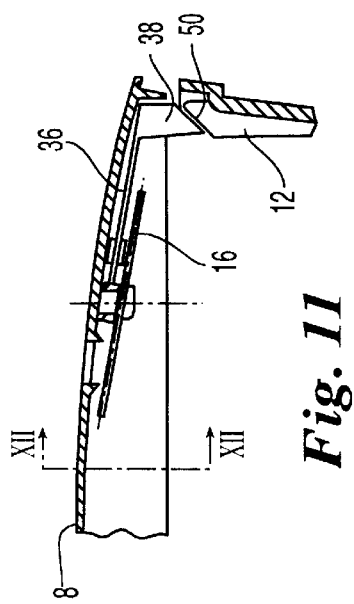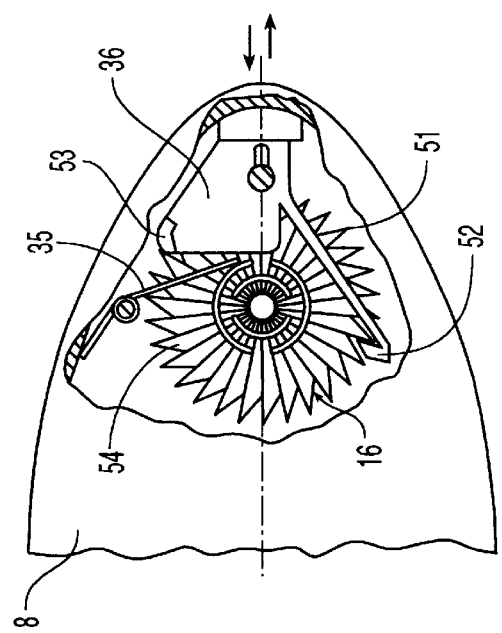

VESSEL FOR FILTERING LIQUIDS, PARTICULARLY DRINKING WATER HAVING DEVICE FOR COUNTING OCCASIONS OF VESSEL ACCESS

TECHNICAL FIELD

The subject of the invention is a vessel for filtering liquids, particularly drinking water, wherein the vessel includes a container and a receptacle for the liquid to be filtered with a filter therebetween and a cover.

The vessel is of the type which has a replaceable filter cartridge and in which, to ensure efficient filtering, the filter cartridge has to be removed and replaced after a certain number of cycles and/or after a predetermined period of time.

BACKGROUND ART

According to the prior art, it is up to the user to remember to replace the cartridge once its filtering capacity must be considered exhausted. However, it may not be at all easy to remember the number of filtering cycles carried out after the last replacement of the cartridge.

SUMMARY OF THE INVENTION

The object of the invention is to provide a filtering vessel, the structure and operation of which are such as to facilitate the user's task of monitoring the efficiency of the filter cartridge in order to replace it once the useful filtering cycles provided for have been carried out.

The object of the invention is achieved by providing a vessel for filtering liquids that includes a container, a receptacle for the liquid to be filtered, and a filtering means between the receptacle and the container. To access the container, a lid is removably fitted on the container. A counting device to be associated with the lid and the container. The counting device detects and counts the occasions that access is gained to the container. Furthermore, the counting device is automatically activated when the lid is removed from the container. Any removal of the lid is therefore detected and counted by the counting device.

SHORT DESCRIPTION OF DRAWINGS

Figure 2:
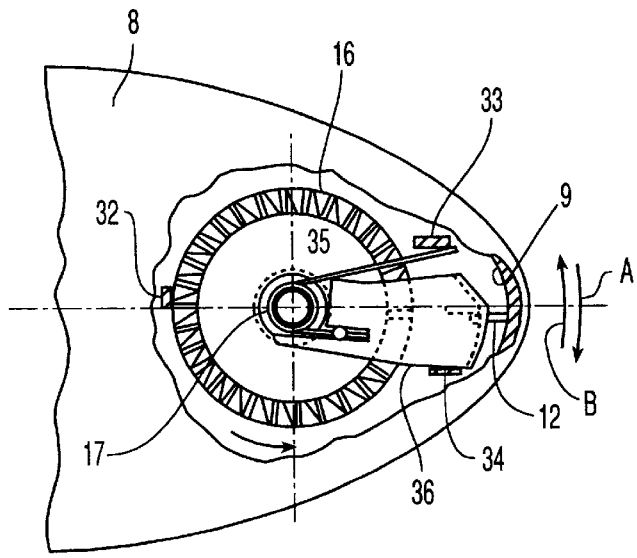
Figure 3:
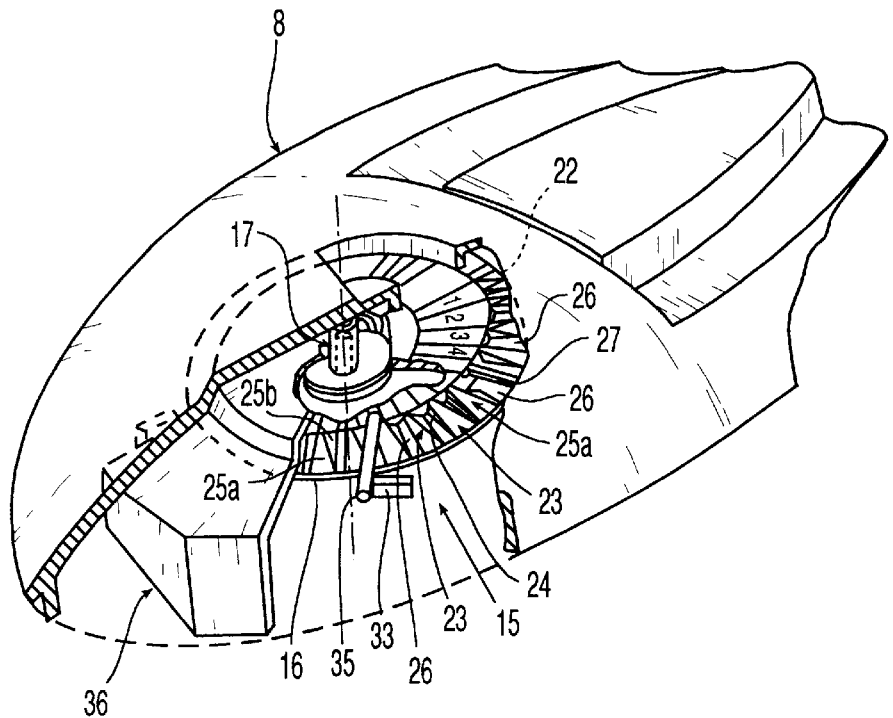
Figure 4:
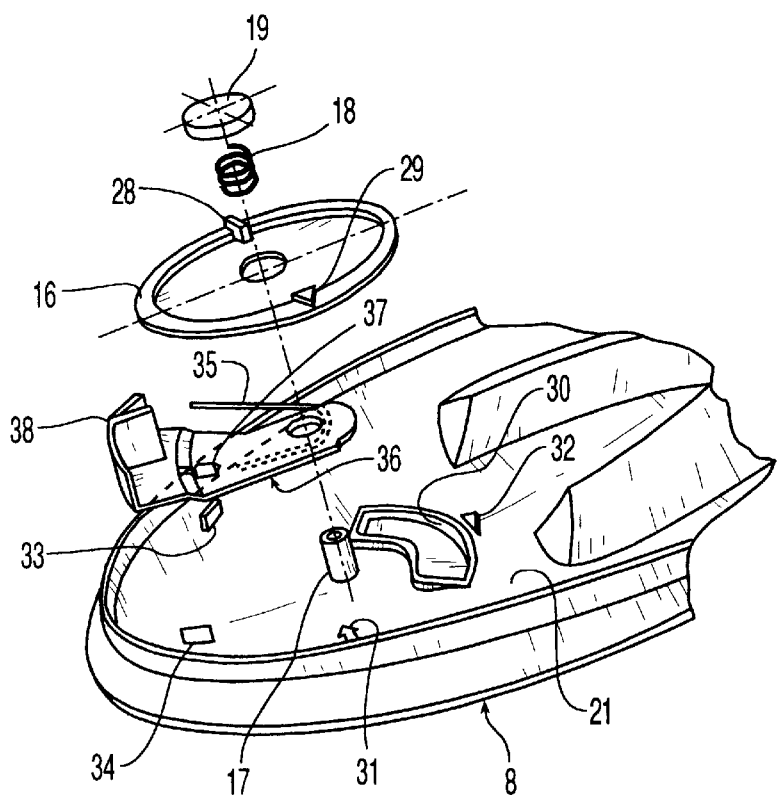
Figure 5:
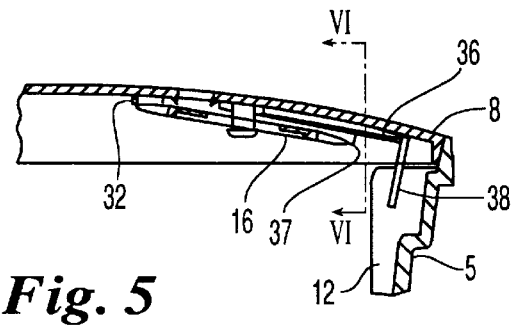
Figure 6:
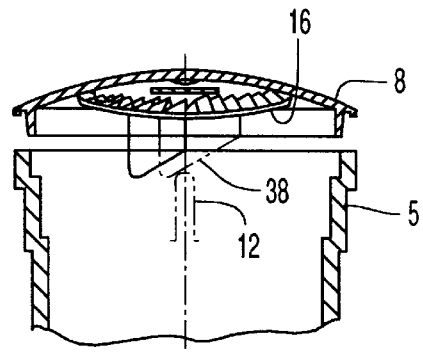
Figure 7:
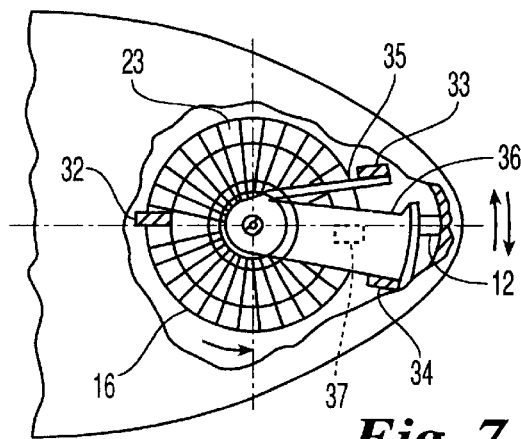
Figure 9:
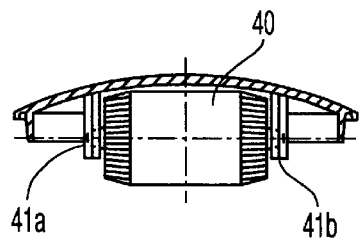
Figure 8:
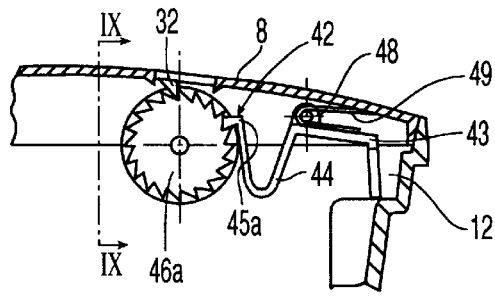
Figure 10:
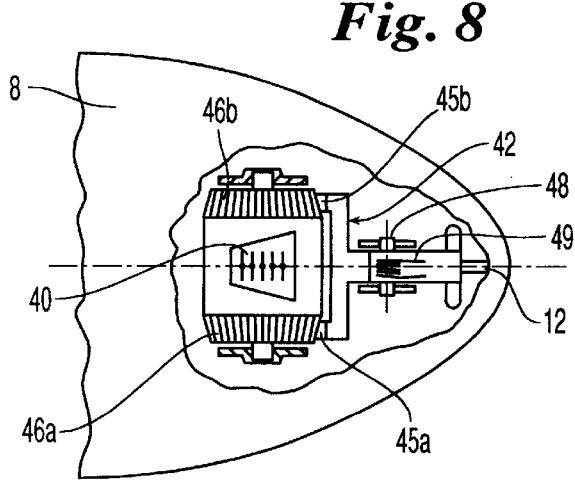
Figure 18:
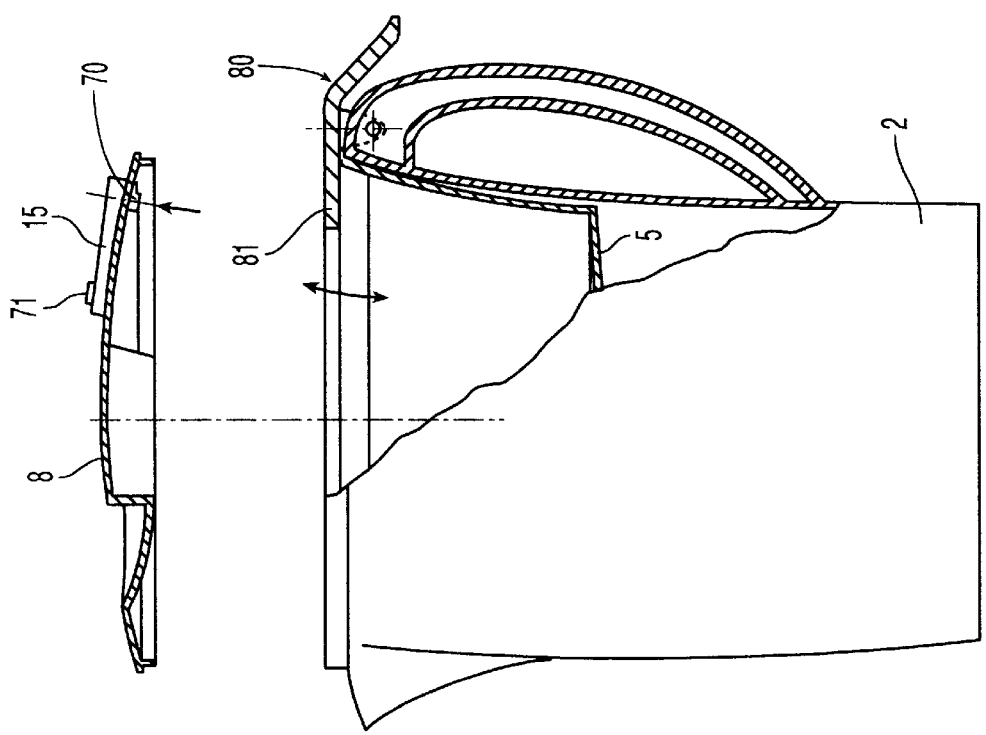
Figure 17:
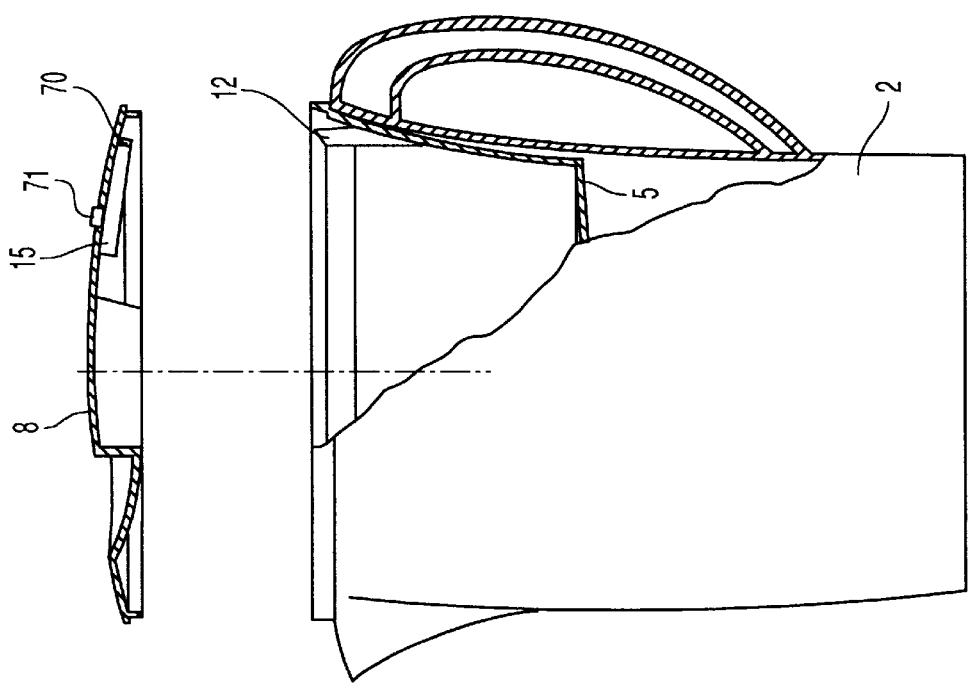
Figure 19:
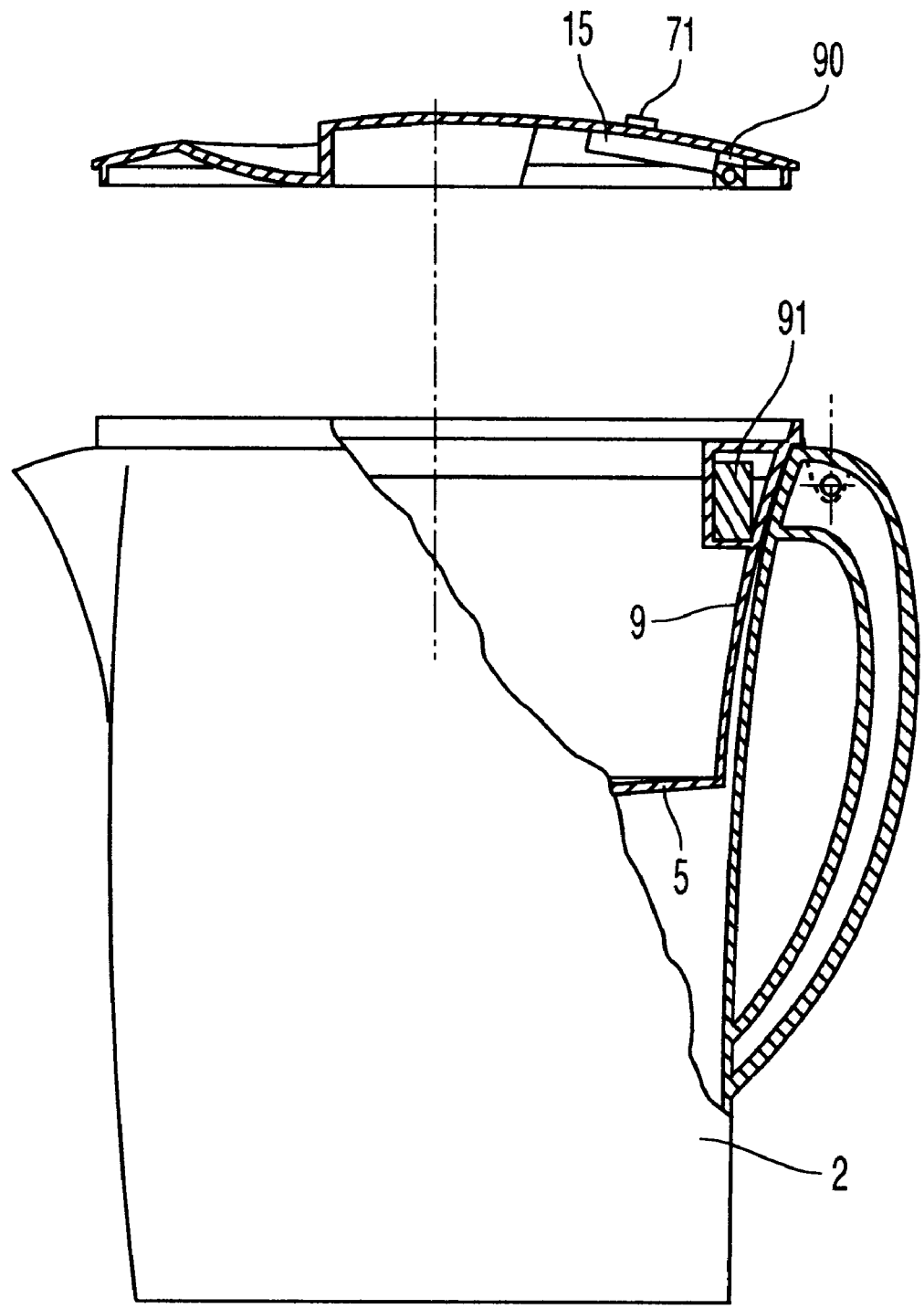

The characteristics and advantages of the invention will become clearer from the detailed description of some preferred but not exclusive embodiments thereof illustrated in the appended drawings, in which:

FIG. 1 is a front elevational view of a vessel according to the invention shown in partial section, FIG. 2 is a partially-sectioned plan view of a detail of the vessel from above, FIG. 3 is a partially-sectioned perspective view of a further detail of the same vessel from above, FIG. 4 is an exploded perspective view of the detail of FIG. 3 from below, FIG. 5 is a longitudinal section of a first variant of the vessel of the previous drawings, shown only partially, FIG. 6 is a section taken on the line VI—VI of FIG. 5, FIG. 7 is a partially-sectioned plan view of the vessel of FIGS. 5 and 6 from above, FIG. 8 is a longitudinal section of a second variant of the vessel of the previous drawings, shown only partially, FIG. 9 is a section taken on the line IX—IX of FIG. 8, FIG. 10 is a partially-sectioned plan view of the vessel of FIGS. 8 and 9 from above, FIG. 11 is a longitudinal section of a third variant of the vessel of the previous drawings, shown only partially, FIG. 12 is a section taken on the line XII—XII of FIG. 11, FIG. 13 is a partially-sectioned plan view of the vessel of FIGS. 11 and 12 from above, FIG. 14 is a longitudinal section of a fourth variant of the vessel of the previous drawings, shown only partially, FIG. 15 is a section taken on the line XV—XV of FIG. 14, FIG. 16 is a partially-sectioned plan view of the vessel of FIGS. 14 and 15 from above, FIGS. 17, 18 and 19 are partially-sectioned side elevational views of three further variants of the vessel of the invention.

EMBODIMENTS OF THE INVENTION

In FIGS. 1 to 3, a vessel according to the present invention is generally indicated 1; it comprises a jug 2 with a handle 3 and a spout 4 for pouring out the filtered water, a funnel-shaped container 5 housed in the jug 2 and supported with form coupling in a mouth portion 7 thereof and a lid 8 positioned removably for closing the container 5.

The container 5 defines, in known manner, a receptacle 9, in the base of which there is a housing 10 for a filter cartridge 11 replaceable, for example, after a predetermined number of filtering cycles. By way of indication, it may be assumed that the cartridge 11 is arranged to perform thirty filtering cycles and has to be replaced upon completion of the thirtieth cycle.

A plate-like catch projection 12 projects radially inwardly from the wall of the receptacle 9 of the container 5 on the side facing the spout 4.

According to the invention, the lid 8 has a device, generally indicated 15, for counting the number of filtering cycles carried out by the cartridge 11. The device 15 comprises a display disc 16 which is rotatable about a peg 17 integral with the lid 8 and is urged resiliently against the facing wall 21 of the lid 3 by means of a helical spring 18 which abuts the head of a pin 19 driven into the peg 17.

A scale 22 graduated in numbered sectors is printed on thee face of the disc 16 facing the wall 21; for each sector of the scale 22 the outer edge of the disc 16 has a respective trapezoidal tooth 23 with a face 24 which is substantially vertical or is disposed in a plane containing the axis of rotation of the disc, and with two sides 25a, 25b tapered like inclined planes. The teeth are spaced apart by respective recesses with flat bases 26.

One of the recesses 26 between two adjacent teeth of the disc 16 is at least partially blocked by a bridge 27 provided for stopping the disc 16 upon completion of a predetermined rotation as will be explained further below. In the embodiment illustrated, the bridge 27 is shown in a fictitious angular position, purely by way of example and for clarity of the drawing; it would actually be diametrally opposite the sector bearing the word "STOP" and hence in a position not visible in the drawing.

The opposite face of the disc 16 has a grip 28 (which serves for the manual rotation of the disc 16) and an opposed indicator arrow 29.

In addition to the peg 17, the wall 21 of the lid 8 has a window 30 extending through the lid to enable the scale 22 to be seen from outside the container 5, an indicator arrow 31 which is intended to correspond to the arrow 29 for the initial positioning of the disc 16 after the filter cartridge 11 has been replaced, a unidirectional stop tooth 32 for the disc 16 to prevent it from rotating backwards and two appendages, indicated 33 and 34, respectively. The appendage 33 serves as a shoulder for a spring 35 which urges a pawl 36 resiliently into abutment against the appendage 34. The pawl 36 is supported for pivoting on the peg 17 and bears a unidirectional stop tooth 37 for advancing the disc as well as a cam profile 38 with a ramp or inclined plane which can cooperate with the catch projection 12 of the receptacle portion 9 to bring about a complete oscillation of the pawl 36 as a result of each opening and subsequent closure of the lid 8.

The pawl 36 with the unidirectional stop tooth 32 and the set of teeth 23 formed on the edge of the disc 16 constitute an escapement ratchet mechanism for the stepped rotation of the disc 16 upon each opening and subsequent closure of the lid 8.

It can be seen that, as it rotates about its own axis, the disc 16 can pass over both the tooth 32 and the tooth 37 owing to the resilience of its mounting on the peg 17.

The vessel just described operates as follows. The water to be filtered is first introduced into the container 5 after the lid 8 has been removed. When the lid is removed, the pawl is pivoted in the sense indicated by the arrow A under the action of the spring 35 and the stop tooth 37 formed thereon is made to pass over the tooth adjacent that previously engaged by sliding on the inclined planes of the sides 25a, 25b thereof.

The pawl is thus prepared for entraining the disc 16 upon subsequent closure of the container by means of the lid 8.

When this occurs, the engagement between the catch projection 12 on the container and the cam profile 38 on the pawl causes the latter to pivot about its own axis in the sense indicated by the arrow B, entraining the display disc by one step.

When, however, upon completion of the thirtieth opening and closure cycle of the lid 8, the unidirectional stop tooth 37 of the pawl 36 is brought to the bridge-like cross-piece 27 between two adjacent teeth 23, whereas the unidirectional stop tooth 32 correctly prevents the disc from rotating backwards, any further rotation of the disc 16 is prevented, possibly with the display through the window 30 of an indication advising that the cartridge 11 should be replaced.

In the variants of the vessel of the invention, similar or functionally equivalent details are indicated by the same reference numerals as in the embodiment just described. The vessel of FIGS. 5 to 7 differs from the embodiment described in that the spring 35 is formed integrally with the pawl 36. The remaining details and the operation of the counting device are equivalent to those of the vessel 1.

The vessel of FIGS. 8 to 10 differs from the previous one in that, instead of the display disc, it has a drumlike counting device 40 supported for rotation between two shoulders 41a, 41b and rotated in steps about its own axis by an escapement ratchet mechanism 42 of which the pawl, indicated 43, is supported on the lid 8 on a pin 48 and is acted on resiliently by a spring 49. The pawl 43 comprises a resilient arm 44 carrying two hooks 45a, 45b, each in engagement with a respective set of teeth 46a, 46b and is pivoted about the pin 48 by interference with the catch projection 12 upon each opening and subsequent closure of the lid onto the container 5.

In the vessel of FIGS. 11 to 13, the pawl 36 is slidable longitudinally on the lid 8 rather than being pivotable. The cam profile 38 is a profile with an inclined plane cooperating with a corresponding inclined plane 50 on the catch projection 12. On one side, the pawl 36 bears a resilient arm 51 on the free end of which a hook 52 is formed; on the opposite side, the pawl has a catch formation 53 for limiting the rotation of the display disc 16 in one sense.

The display disc 16 has a plurality of teeth 54 with sawtooth profiles on its upper face facing the surface 21 of the lid 8.

The embodiment of FIGS. 14 to 16 differs from the previous embodiment essentially in that, in this embodiment, the catch-like formation 53 is replaced by a separate hook 60 mounted for limited pivoting on the lid 8 with the ability for an arm 61 of the hook 60 to catch against a lateral wall 62 of the lid 8.

Further embodiments of the vessel of the invention are described with reference to FIGS. 17 to 19. All of these embodiments have in common the fact that the counting device 15 associated with the lid 8 of the vessel has electronic counting means which enable the number of openings and closures of the vessel 1 carried out to be memorized in order to warn the user automatically by a signal, for example, a sound or visual signal, that the filter cartridge 11 should be replaced.

Provision is also made for the insertion of a suitable timer in the device for warning that the cartridge 11 has expired, for example, owing to age, and should therefore be replaced regardless of the number of openings and closures of the lid 8.

In the embodiment shown in FIG. 17, the count which can be read in the display 71 visible through the window 30 is operated by the catch projection 12 which operates a push-button 70 mounted on the electronic counting device 15 fixed to the lid 8.

In the embodiment shown in FIG. 18, the electronic counting device 15 is operated by a lever 80 a front portion 81 of which acts on the push-button 70 which, upon the closure of the lid 8 also rotates the numbering on the display 71 visible on the upper wall of the electronic device 15.

In a further variant of the device of the invention, the display 71 (FIG. 19) is operated by a magnetic mass 90 acted on by a magnet 91 mounted on the receptacle 9. Naturally, an attraction or repulsion effect of the magnet 91 on the magnetic mass 90 may be provided for without distinction.

I claim:

1. A vessel for filtering liquids comprising:
   a container mounted in said vessel, said container including a receptacle for the liquid to be filtered, and filtering means for filtering liquid passing from said receptacle to said vessel;
   a lid removably fitted on the container for access thereto: and
   a counting device for detecting and counting the occasions on which access is gained to the container for pouring therein liquid to be filtered, the counting device being mounted to or contained on the lid or both the lid and the container and configured and arranged to be actuated by removal of the lid from the container and/or replacement of the lid onto for detecting and counting the occasions on which access is gained to the container by means of the lid.

2. A vessel according to claim 1, in which the counting device (15) comprises a ratchet mechanism (16, 36) mounted on the lid (8) and operatively associated with a display (16), the ratchet mechanism comprising an operating catch projection (12) cooperating with a profile (38) on the lid (8), respectively, in order to advance the display (16) in steps as a result of each removing and/or replacing of the the lid (8).

3. A vessel according to claim 2, in which the ratchet mechanism is of the escapement type.

4. A vessel according to claim 3, in which the ratchet mechanism and the display (16, 36) are mounted on the lid (8) and the operating catch projection (12) is formed on the container in a position such as to interfere with the profile (38) during the removing and replacing of the lid (8).

5. A vessel according to claim 3, in which the ratchet mechanism comprises a toothed disc-shaped element (16) and a pawl (36) acting on the teeth (23) of the disc-shaped element (16), both being engaged on the lid (8) coaxially with one another.

6. A vessel according to claim 1, in which the counting device (15) is electronic or electromechanical and comprises a pulse generator (12, 70; 81, 70; 90, 91) which can generate a pulse for each removing and/or replacing of the lid (8), a counter (15) for counting the pulses generated by the generator and a display (71) for displaying the pulses counted.

* * * * *